(12) United States Patent
Tsurutome et al.

(10) Patent No.: US 8,594,627 B2
(45) Date of Patent: Nov. 26, 2013

(54) REMOTELY PROVISIONED WIRELESSLY PROXY

(75) Inventors: Kevin Tsurutome, San Francisco, CA (US); Bob Barcklay, Berkeley, CA (US); Robert Wang, Castro Valley, CA (US)

(73) Assignee: TeleCommunications Systems, Inc., Annapolis, MD (US)

( * ) Notice: Subject to any disclaimer, the term of this patent is extended or adjusted under 35 U.S.C. 154(b) by 203 days.

(21) Appl. No.: 12/588,142

(22) Filed: Oct. 6, 2009

(65) Prior Publication Data

US 2010/0087167 A1    Apr. 8, 2010

Related U.S. Application Data

(60) Provisional application No. 61/136,806, filed on Oct. 6, 2008.

(51) Int. Cl.
*H04M 1/66* (2006.01)

(52) U.S. Cl.
USPC ............. 455/411; 455/414.1; 455/414.3; 455/297; 455/575.9; 719/317; 709/202

(58) Field of Classification Search
USPC ........... 455/404.2, 444, 575.9, 297, 414.1, 455/414.3; 709/202; 719/317
See application file for complete search history.

(56) References Cited

U.S. PATENT DOCUMENTS

| | | | |
|---|---|---|---|
| 5,263,136 A | 11/1993 | DeAguiar | |
| 5,359,529 A | 10/1994 | Snider | |
| 5,781,200 A | 7/1998 | Lu | |
| 5,832,408 A | 11/1998 | Tamai | |
| 5,973,700 A | 10/1999 | Taylor | |
| 6,021,406 A | 2/2000 | Kuznetsov | |
| 6,026,398 A | 2/2000 | Brown | |
| 6,064,941 A | 5/2000 | Nimura | |
| 6,104,416 A | 8/2000 | McGuinness | |
| 6,108,650 A | 8/2000 | Musk | |

(Continued)

FOREIGN PATENT DOCUMENTS

| | | |
|---|---|---|
| EP | 1128163 | 8/2001 |
| JP | 2008 039698 | 2/2008 |
| WO | WO2006/125291 | 5/2005 |
| WO | WO2006/071271 | 6/2005 |

OTHER PUBLICATIONS

PCT International Search Report in PCT/US2009/05487 dated Nov. 17, 2009.

(Continued)

*Primary Examiner* — Khalid Shaheed
(74) *Attorney, Agent, or Firm* — William H. Bollman

(57) ABSTRACT

A remotely provisioned proxy within a wireless/mobile phone that proxies a wireless communication path between a disconnected piconet (e.g., BLUETOOTH™) device and a network resource such as a universal resource locator (URL) via a mating mobile phone. Thus, an application proxy module embodied within the mobile phone provides managed access of a piconet device connected to the mating mobile phone to remote services. A disconnected piconet device uses the full data bandwidth available to a wireless phone, without the need for the disconnected piconet device to include its own separate wireless front end, or to require use of a modem within the mobile phone. Thus, using a mobile phone with application proxy, the user need not pay for the luxury of a tethered data plan.

14 Claims, 3 Drawing Sheets

(56) References Cited

U.S. PATENT DOCUMENTS

| | | | |
|---|---|---|---|
| 6,119,013 A | 9/2000 | Maloney | |
| 6,144,338 A | 11/2000 | Davies | |
| 6,262,741 B1 | 7/2001 | Davies | |
| 6,317,686 B1 | 11/2001 | Ran | |
| 6,377,945 B1 | 4/2002 | Risvik | |
| 6,401,034 B1 | 6/2002 | Kaplan | |
| 6,424,912 B1 | 7/2002 | Correia | |
| 6,434,482 B1 | 8/2002 | Oshida | |
| 6,470,189 B1 | 10/2002 | Hill | |
| 6,480,783 B1 | 11/2002 | Myr | |
| 6,487,495 B1 | 11/2002 | Gale | |
| 6,507,785 B1 | 1/2003 | Stefan | |
| 6,523,021 B1 | 2/2003 | Monberg | |
| 6,529,143 B2 | 3/2003 | Mikkola | |
| 6,571,169 B2 | 5/2003 | Miyaki | |
| 6,587,782 B1 | 7/2003 | Nocek | |
| 6,636,803 B1 | 10/2003 | Hartz | |
| 6,671,424 B1 | 12/2003 | Skoll | |
| 6,714,205 B1 | 3/2004 | Miyahita | |
| 6,734,867 B1 | 5/2004 | Munshi | |
| 6,820,092 B2 | 11/2004 | Nakano | |
| 6,940,407 B2 | 9/2005 | Miramda-Knapp | |
| 6,954,697 B1 | 10/2005 | Smith | |
| 7,054,743 B1 | 5/2006 | Smith | |
| 7,093,286 B1 | 8/2006 | King | |
| 7,155,339 B2 | 12/2006 | Tu | |
| 7,162,470 B2 | 1/2007 | Sharma | |
| 7,190,839 B1 | 3/2007 | Feather et al. | |
| 7,373,246 B2 | 5/2008 | O'Clair | |
| 7,379,729 B2 | 5/2008 | Holland | |
| 7,385,600 B2 | 6/2008 | Marion | |
| 7,409,219 B2 | 8/2008 | Levitan | |
| 7,444,326 B1 | 10/2008 | Jagadish | |
| 7,480,566 B2 | 1/2009 | Laverty | |
| 7,499,914 B2 | 3/2009 | Diab | |
| 7,546,202 B2 | 6/2009 | Oh | |
| 7,548,915 B2 | 6/2009 | Ramer | |
| 7,565,239 B2 | 7/2009 | De Silva et al. | |
| 7,627,656 B1 | 12/2009 | Anand et al. | 709/220 |
| 7,706,977 B2 * | 4/2010 | Soehren | 701/215 |
| 7,747,611 B1 | 6/2010 | Milic-Frayling | |
| 7,853,403 B2 | 12/2010 | Tanaka | |
| 7,917,154 B2 | 3/2011 | Fortescue | |
| 7,949,642 B2 | 5/2011 | Yang | |
| RE42,927 E | 11/2011 | Want | |
| 8,095,434 B1 | 1/2012 | Puttick | |
| 8,265,864 B1 | 9/2012 | Kaufman | |
| 8,296,062 B2 | 10/2012 | Yamane | |
| 2001/0021894 A1 | 9/2001 | Sakamoto | |
| 2001/0038626 A1 | 11/2001 | Dynarski | |
| 2001/0047241 A1 | 11/2001 | Khavakh | |
| 2002/0021231 A1 | 2/2002 | Schlager | |
| 2002/0037716 A1 | 3/2002 | McKenna | |
| 2002/0042819 A1 | 4/2002 | Reichert | |
| 2002/0067353 A1 | 6/2002 | Kenyon | |
| 2002/0082774 A1 | 6/2002 | Bloebaum | |
| 2002/0083062 A1 | 6/2002 | Neal | |
| 2002/0098851 A1 | 7/2002 | Walczak | |
| 2002/0130953 A1 | 9/2002 | Riconda | |
| 2002/0190861 A1 | 12/2002 | Wentworth | |
| 2002/0198694 A1 | 12/2002 | Yang | |
| 2003/0011623 A1 | 1/2003 | Dermer | |
| 2003/0033083 A1 | 2/2003 | Nakashima | |
| 2003/0034936 A1 | 2/2003 | Ernst | |
| 2003/0055555 A1 | 3/2003 | Knockheart | |
| 2003/0071728 A1 | 4/2003 | McDonald | |
| 2003/0095525 A1 * | 5/2003 | Lavin et al. | 370/338 |
| 2003/0128211 A1 | 7/2003 | Watanabe | |
| 2003/0182052 A1 | 9/2003 | Delorme | |
| 2004/0003125 A1 | 1/2004 | Ichimura | |
| 2004/0023645 A1 * | 2/2004 | Olsen et al. | 455/418 |
| 2004/0027258 A1 | 2/2004 | Pechatnikov | |
| 2004/0030493 A1 | 2/2004 | Pechatnikov | |
| 2004/0135784 A1 | 7/2004 | Cohen | |
| 2004/0158829 A1 | 8/2004 | Beresin | |
| 2004/0185870 A1 | 9/2004 | Matsuda | |
| 2004/0203603 A1 | 10/2004 | Pierce | |
| 2004/0203873 A1 | 10/2004 | Gray | 455/456.1 |
| 2004/0215641 A1 | 10/2004 | Kuthuri | |
| 2004/0217980 A1 | 11/2004 | Radburn | |
| 2004/0220918 A1 | 11/2004 | Scriffignano | |
| 2004/0224702 A1 | 11/2004 | Chaskar | |
| 2004/0225437 A1 | 11/2004 | Endo | |
| 2004/0249568 A1 | 12/2004 | Endo | |
| 2005/0148342 A1 | 7/2005 | Sylvain | |
| 2005/0149253 A1 | 7/2005 | Nambata | |
| 2005/0188333 A1 | 8/2005 | Hunleth | |
| 2005/0228780 A1 | 10/2005 | Diab | |
| 2005/0251331 A1 | 11/2005 | Kreft | |
| 2005/0270311 A1 | 12/2005 | Rasmussen | |
| 2005/0288033 A1 | 12/2005 | McNew | |
| 2006/0005114 A1 | 1/2006 | Williamson | |
| 2006/0015513 A1 | 1/2006 | Poyhonen et al. | 707/100 |
| 2006/0023626 A1 | 2/2006 | Krausz | |
| 2006/0055693 A1 | 3/2006 | Sylthe | |
| 2006/0064235 A1 | 3/2006 | Ishikawa | |
| 2006/0089788 A1 | 4/2006 | Laverty | |
| 2006/0089792 A1 | 4/2006 | Manber | |
| 2006/0105782 A1 | 5/2006 | Brock | |
| 2006/0116818 A1 | 6/2006 | Chao et al. | 701/211 |
| 2006/0135178 A1 | 6/2006 | Allyn | |
| 2006/0155679 A1 | 7/2006 | Kothuri | |
| 2006/0167616 A1 | 7/2006 | Yamane | |
| 2006/0167621 A1 | 7/2006 | Dale | |
| 2006/0174209 A1 | 8/2006 | Barros | |
| 2006/0200304 A1 | 9/2006 | Oh | |
| 2006/0200308 A1 | 9/2006 | Arutunian | |
| 2006/0206586 A1 | 9/2006 | Ling | |
| 2006/0223518 A1 | 10/2006 | Haney | |
| 2006/0229802 A1 | 10/2006 | Vertelney | |
| 2006/0246922 A1 | 11/2006 | Gasbarro | |
| 2006/0253247 A1 | 11/2006 | De Silva et al. | |
| 2007/0010942 A1 | 1/2007 | Bill | |
| 2007/0015518 A1 | 1/2007 | Winter | |
| 2007/0036318 A1 | 2/2007 | Gits et al. | 379/202.01 |
| 2007/0072620 A1 | 3/2007 | Levitan | |
| 2007/0078848 A1 | 4/2007 | Sareen | |
| 2007/0083557 A1 | 4/2007 | Leiserowitz | |
| 2007/0083649 A1 * | 4/2007 | Zuzga et al. | 709/224 |
| 2007/0094042 A1 | 4/2007 | Ramer | |
| 2007/0118520 A1 | 5/2007 | Bliss | |
| 2007/0124216 A1 | 5/2007 | Lucas | |
| 2007/0153983 A1 | 7/2007 | Bloebaum | |
| 2007/0156334 A1 | 7/2007 | Vu | |
| 2007/0174259 A1 | 7/2007 | Amjadi | |
| 2007/0213043 A1 | 9/2007 | Son | 455/422.1 |
| 2007/0219706 A1 | 9/2007 | Sheynblat | |
| 2007/0219708 A1 | 9/2007 | Brasche | |
| 2007/0233817 A1 | 10/2007 | Johnson | |
| 2007/0238472 A1 | 10/2007 | Wanless | |
| 2007/0239752 A1 | 10/2007 | Beitman | |
| 2007/0253642 A1 | 11/2007 | Berrill | |
| 2007/0281690 A1 | 12/2007 | Altman et al. | |
| 2007/0288613 A1 | 12/2007 | Sudame et al. | 709/223 |
| 2007/0298812 A1 | 12/2007 | Singh | |
| 2008/0004043 A1 | 1/2008 | Wilson | |
| 2008/0071465 A1 | 3/2008 | Chapman | |
| 2008/0082262 A1 | 4/2008 | Silva et al. | |
| 2008/0104059 A1 | 5/2008 | Segel | |
| 2008/0104227 A1 | 5/2008 | Birnie | |
| 2008/0112551 A1 | 5/2008 | Forbes et al. | 379/142.1 |
| 2008/0120293 A1 | 5/2008 | Morisawa | |
| 2008/0130597 A1 | 6/2008 | Kalhan | 370/338 |
| 2008/0139114 A1 | 6/2008 | Ranganathan | 455/41.1 |
| 2008/0140307 A1 | 6/2008 | Chen | |
| 2008/0154856 A1 | 6/2008 | Riise | |
| 2008/0154888 A1 | 6/2008 | Burton | |
| 2008/0177462 A1 | 7/2008 | Yoshioka | |
| 2008/0177839 A1 | 7/2008 | Chang | |
| 2008/0218407 A1 | 9/2008 | Norda | |
| 2008/0249983 A1 | 10/2008 | Meisels | |
| 2008/0261560 A1 | 10/2008 | Ruckart | 455/411 |
| 2008/0268822 A1 | 10/2008 | Johnson | |
| 2008/0270366 A1 | 10/2008 | Frank | |

(56) References Cited

U.S. PATENT DOCUMENTS

| | | |
|---|---|---|
| 2008/0275637 A1 | 11/2008 | Kim |
| 2008/0280599 A1* | 11/2008 | Cheng ........................... 455/415 |
| 2008/0307445 A1 | 12/2008 | Garg .............................. 719/328 |
| 2008/0319990 A1 | 12/2008 | Taranenko |
| 2009/0009397 A1 | 1/2009 | Taylor |
| 2009/0018840 A1 | 1/2009 | Lutz |
| 2009/0029693 A1* | 1/2009 | Liwell et al. .................. 455/419 |
| 2009/0055087 A1 | 2/2009 | Beacher |
| 2009/0061852 A1* | 3/2009 | Feher .......................... 455/426.1 |
| 2009/0100037 A1 | 4/2009 | Scheibe |
| 2009/0132514 A1 | 5/2009 | Kisluk |
| 2009/0144247 A1 | 6/2009 | Wistrand et al. |
| 2009/0144260 A1 | 6/2009 | Bennett |
| 2009/0150349 A1 | 6/2009 | Cartin |
| 2009/0171934 A1 | 7/2009 | Ratnakar |
| 2009/0171955 A1 | 7/2009 | Merz |
| 2009/0192702 A1 | 7/2009 | Bourne |
| 2009/0210413 A1 | 8/2009 | Hayash |
| 2009/0222438 A1 | 9/2009 | Strandell |
| 2009/0237307 A1* | 9/2009 | Tsai et al. .............. 343/700 MS |
| 2009/0248663 A1 | 10/2009 | Maniyar |
| 2009/0325615 A1* | 12/2009 | McKay et al. ................ 455/466 |
| 2010/0094550 A1 | 4/2010 | Tsurutome et al. |
| 2011/0035141 A1 | 2/2011 | Barker |

OTHER PUBLICATIONS

International Search Report in PCT/US2009/05486 dated Jan. 21, 2010.
Ahern et al., "World Explorer: Visualizing Aggregate Data from Unstructured Text in Geo-Referened Collections," Jun. 18-23, 2007, ACM, JCDL'07.
International Search Report in PCT/US2008/10543 dated Aug. 19, 2010.
International Search Report in PCT/US2008/10542 dated Aug. 19, 2010.
European Search Report received in European Appl. No. 09819546.4 dated Oct. 15, 2012.
John Krumm et al, "Map Matching with Travel Time Constraints", SAE 2007 World Congress, Apr. 19, 2007.
European Search Report received in European Appl. No. 09819547.2 dated Oct. 16, 2012.

* cited by examiner

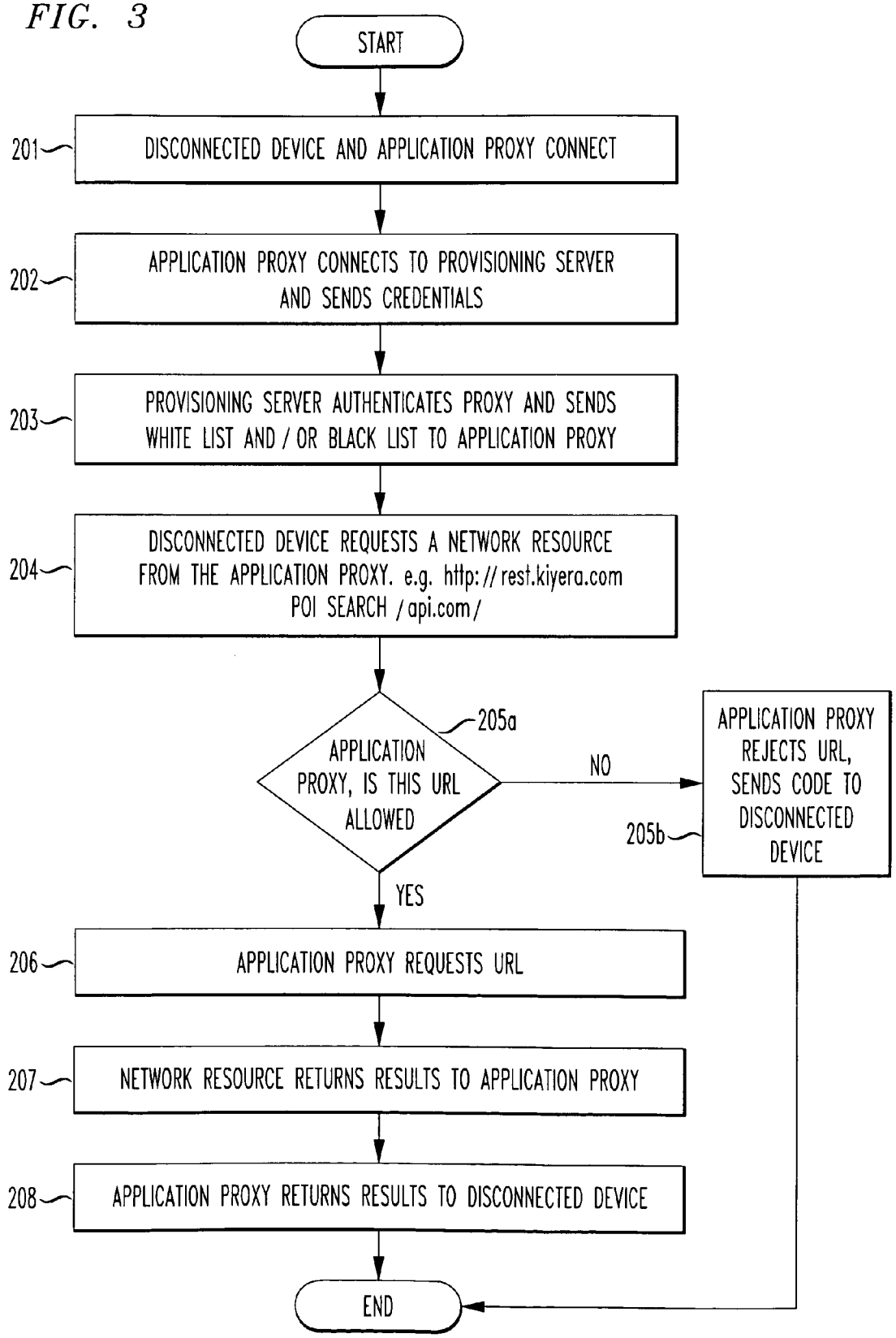

REMOTELY PROVISIONED WIRELESSLY PROXY

This application claims priority from U.S. Provisional Application No. 61/136,806, entitled "Remotely Provisioned Wireless Proxy" to Tsurutome et al., filed Oct. 6, 2008, the entirety of which is explicitly incorporated herein by reference.

BACKGROUND OF THE INVENTION

1. Field of the Invention

This invention relates generally to wireless telecommunications. More particularly, it relates to improved integration, provisioning, and provisioning of two-way data communication services with vehicle piconet devices, including In-Car Navigation Systems, Personal Navigation Devices and Ultra-Mobile PCs.

2. Background of the Related Art

This invention relates to provisioning of two-way data communication services with vehicle piconet devices, including In-Car Navigation Systems, Personal Navigation Devices and Ultra-Mobile PCs. Some conventional techniques include the use of an embedded communications module. An embedded communications module (ECM) provides a dedicated data communications module within a mobile device and vehicle hardware. But the cost of ECM hardware is a problem as is the cost of the data connection. Solutions that have used this approach tend to cost consumers $10-$12 per month, which is too high for many consumers. Moreover, the cost of provisioning and managing SIMs and accounts also adds to the cost of the solution.

Other companies have used a modem within a mobile phone to provide a data service, thus making use of a mobile phone as a modem. A mobile phone used as a modem is typically offered by wireless operators for consumers to connect their PC to the Internet. However, these solutions have high priced data plans, typically $30 to $60/month, and thus most consumers do not purchase this option for their mobile phones. This solution can also be difficult to configure, and does not provide a way to provide granular management of bandwidth and services. Moreover, access can only be turned on or off for all services.

Still other conventional solutions have deployed data over voice techniques, e.g., Airbiquity™ data over voice solution, embedded data communications modules; and M2M service providers such as Jasper wireless. Unfortunately, data over voice solutions are typically very low bandwidth and not suitable for many applications.

SUMMARY OF THE INVENTION

In accordance with the principles of the present invention, a method of provisioning a wireless phone from a network server to autonomously reject a given URL requested by a piconet device connected to the wireless phone comprises compiling a black list of universal resource locator (URL) addresses to a wireless phone. The black list relates to at least one URL that can be requested by a piconet device connected to the wireless phone. The black list of URLs is provided to the wireless phone from a network server via a wireless phone connection. In this way, the wireless phone can autonomously reject a request by the piconet device to a given URL in the black list.

A method of provisioning a wireless phone from a network server to autonomously permit a given URL requested by a piconet device connected to the wireless phone in accordance with another aspect of the invention comprises compiling a white list of universal resource locator (URL) addresses to a wireless phone. The white list relates to at least one URL that can be requested by a piconet device connected to the wireless phone. The white list of URLs is provided to the wireless phone from a network server via a wireless phone connection, whereby the wireless phone can autonomously permit and pass on a request by the piconet device to a given URL in the white list.

In accordance with yet another method of provisioning a wireless phone from a network server to autonomously redirect a given URL requested by a piconet device connected to the wireless phone comprises compiling a redirect list of universal resource locator (URL) addresses to a wireless phone. The redirect list relates to at least one URL that can be requested by a piconet device connected to the wireless phone. The redirect list of URLs is provided to the wireless phone from a network server via a wireless phone connection. In this way, the wireless phone can autonomously pass on a request by the piconet device to a replacement URL from the redirect list based on a match to the requested URL.

BRIEF DESCRIPTION OF THE DRAWINGS

Features and advantages of the present invention will become apparent to those skilled in the art from the following description with reference to the drawings:

FIG. 3 shows an example method of remotely provisioned wireless proxy, in accordance with the principles of the present invention.

DETAILED DESCRIPTION OF ILLUSTRATIVE EMBODIMENTS

The present invention provides a remotely provisioned proxy within a wireless/mobile phone that proxies a wireless communication path between a disconnected piconet (e.g., BLUETOOTH™) device and a network resource such as a universal resource locator (URL) via a mating mobile phone. Thus, an application proxy module embodied within the mobile phone provides managed access to remote services. A disconnected piconet device uses the full data bandwidth available to a wireless phone, without the need for the disconnected piconet device to include its own separate wireless front end, or to require use of a modem within the mobile phone. Thus, using a mobile phone with application proxy, the user need not pay for the luxury of a tethered data plan.

Figure 1:
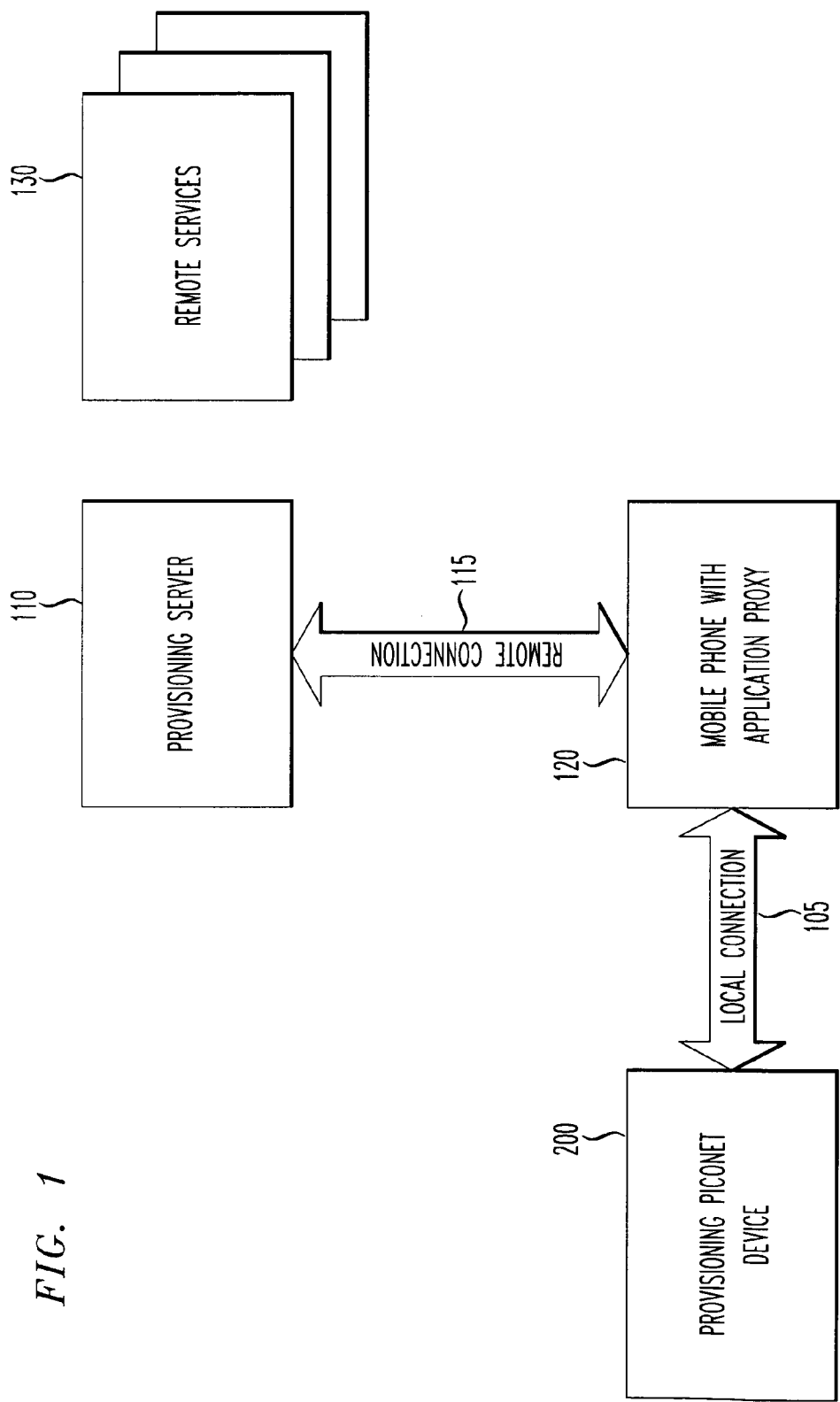
FIG. 1 depicts an application proxy in a mobile phone, connected to a disconnected piconet device, and in communication with a provisioning server, in accordance with the principles of the present invention.

FIG. 1 depicts an application proxy in a mobile phone, connected to a disconnected piconet device, and in communication with a provisioning server, in accordance with the principles of the present invention.

In particular, as shown in FIG. 1, a mobile phone 120 includes an application proxy that proxies information between a provisioning server 110 to a disconnected piconet device 200. The mobile phone 120 establishes a piconet (e.g., BLUETOOTH™) local connection 105 with the disconnected piconet device 200, and a remote wireless connection using a relevant wireless phone protocol (e.g., VoIP) via a remote connection 115. This permits the disconnected piconet device 200 to get information from remote services 130.

The disconnected piconet device 200 can be, e.g., a portable navigation device (PND), telematics hardware, an ultra mobile personal computer (PC), a handheld game, a music player, etc.

The local connection 105 is a piconet such as BLUETOOTH™. The invention is preferably implemented using the Serial Port BLUETOOTH™ Profile which is common on BLUETOOTH™-enabled phones and devices.

The mobile phone with application proxy 120 can be, e.g., a J2ME, BREW, RIM, Symbian, or a Windows Mobile phone.

The remote connection 115 can be established in conformance with an appropriate protocol, e.g., WiMax, EVDO, 1xRTT, EDGE, H SDPA, etc.

Preferably the provisioning server 110 and remote service 130 are accessible on the Internet.

The wireless operator and application provider can manage/monitor the services being provided to the disconnected piconet (e.g., BLUETOOTH™ device). For example, if a wireless operator doesn't want to offer a particular remote service such as YellowPages.com point-of-interest (POI) search, then the wireless operator can disable, block or replace the service with their own.

The wireless operator can disable/turn off users on a user by user, application by application, or device by device basis.

Preferably a generic connection is established which doesn't rely on both the BLUETOOTH™ device and phone to support a particular BLUETOOTH™ profile.

Using the application proxy 100 of a mobile phone with application proxy 120, a disconnected piconet device 200 such as a navigation device can interact with both remote Internet services 130 and services available on the mobile phone with application proxy 120.

Figure 2:
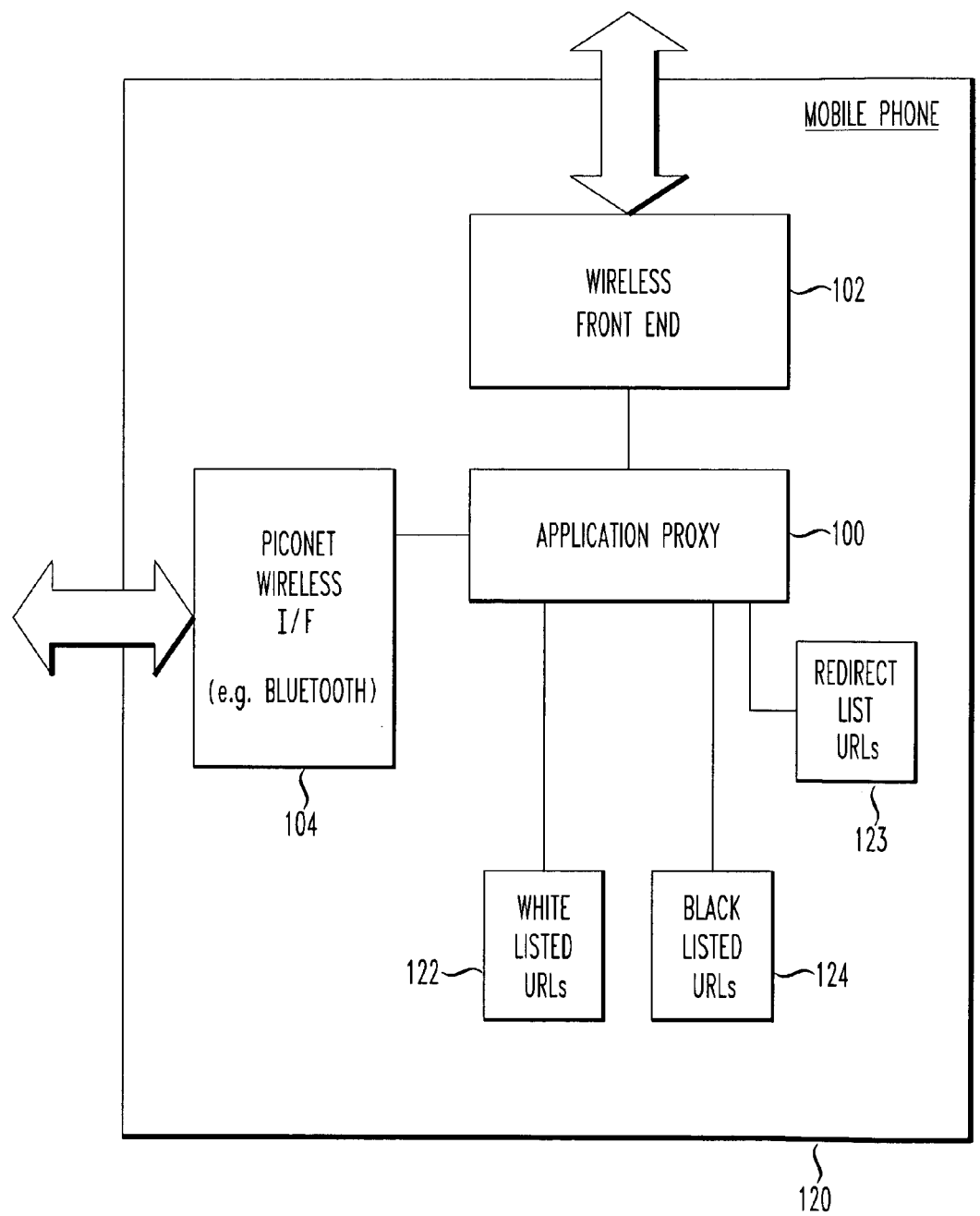
FIG. 2 shows a wireless phone including an application proxy, in accordance with the principles of the present invention.

FIG. 2 shows a wireless phone including an application proxy, in accordance with the principles of the present invention.

In particular, as shown in FIG. 2, a wireless phone 120 includes an otherwise conventional wireless front end 102 for communication with a base station (not shown), and a piconet wireless interface 104 for communication with, e.g., BLUETOOTH™ piconet devices such as a hands-free headset, or hands-free operation in a vehicle (i.e., a disconnected piconet device 200).

Importantly, the wireless phone 120 includes an application proxy 100 that provides proxied facilitation of retrieval of information on a web page from the Internet requested by and for the disconnected piconet device 200.

The disconnected piconet device 200 in accordance with the present invention includes a short range piconet wireless interface, e.g., a BLUETOOTH™ compatible interface. The piconet interface is capable only of short range wireless communications, e.g., within 20 feet. The present invention provides a proxy within a wireless phone 120 to enable the disconnected piconet device 200 to be provided with information from an approve d web site.

Preferably, the web sites accessible by the disconnected piconet device 200 are approved or disapproved by a service provider. The user of the wireless phone 120 may pre-configure approved and/or disapproved web sites (universal resource locators (URLs) with the service provider. In the disclosed embodiments, approved URLs are provided by the service provider to the mobile phone 120 as white listed URLs 122, and disapproved URLs are provided by the service provider to the mobile phone 120 as black listed URLs 124.

FIG. 3 shows an example method of remotely provisioned wireless proxy, in accordance with the principles of the present invention.

In particular, as shown in step 201 of FIG. 3, the disconnected piconet device 200 and the mobile phone with application proxy 120 establish a suitable connection, e.g., over BLUETOOTH™ using the serial port profile. This allows the mobile phone with application proxy 120 and the disconnected piconet device 200 to send messages to each other.

In step 202, the mobile phone with application proxy 120 connects to the provisioning server 110 and sends credentials. The disconnected piconet device 200 authenticates by sending authentication information (some unique identifier) to the mobile phone with application proxy 120.

In step 203, the provisioning server 110 authenticates the mobile phone with application proxy 120, and sends a white list and/or black list to the mobile phone with application proxy 120. The mobile phone with application proxy 120 sends the disconnected piconet device 200 authentication information along with its own identifying information to the provisioning server 110 to make sure a valid account exists and to get any permissions.

In step 204, the disconnected piconet device 200 requests a network resource via the mobile phone with application proxy 120. The provisioning server 110 sends back an OK status as well as allowed (and/or disallowed) locations, preferably returned as a list of URL's with wildcards For each combination of mobile phone with application proxy 120 and disconnected piconet device 200, the provisioning server 110 returns a list of allowed URLs 25 (stored in a white listed URLs table) 122 and/or disallowed URLs (stored in a black listed URLs table) 124. This remote provisioning to the mobile phone with application proxy 120 from the provisioning server 110 enables the mobile phone with application proxy 120 to make decisions about what communication to allow without using 30 bandwidth.

The mobile phone with application proxy 120 is ideally provisioned for each session. Because the mobile phone with application proxy 120 is provisioned for each session, the services the disconnected piconet device 200 can access can be controlled at a very detailed level and with no changes to the disconnected piconet device 200 or the mobile phone with application proxy 120.

In step 205a, the mobile phone with application proxy 120 determines if a particular URL is allowed—not the network resource 130 and not the provisioning server 110. This is important, and greatly reduces bandwidth at the time that the network resource is requested by the disconnected piconet device 200.

The mobile phone with application proxy 120 then compares the requested URL against the network-provided-but-locally-stored white listed URLs table 122 and/or black listed URL table 124.

If the mobile phone with application proxy 120 determines that the URL requested by the disconnected piconet device 200 is permitted to access the requested URL, then processing continues to step 206. If not, in step 205b, the mobile phone with application proxy 120 rejects the URL, and sends an appropriate rejection code or other information regarding the rejection or blocking of the requested URL to the disconnected piconet device 200.

In step 206, the disconnected piconet device 200 sends a request for the given URL in step 205 to the mobile phone with application proxy 120, which passes on the request for the given URL.

In step 207, the requested network resource 130 returns appropriate results to the mobile phone with application proxy 120.

In step 208, the mobile phone with application proxy 120 returns results to the disconnected piconet device 200 of the now-authorized requested URL.

For instance, the disconnected piconet device 200 wants to retrieve a local search for pizza. It determines that it wants to connect to a website with a given URL, The disconnected piconet device 200 sends a request for the given URL in step 205 to the mobile phone with application proxy 120. In step 207, the mobile phone with application proxy 120 itself determines from its white listed URLs 122 and black listed URLs 124 obtained for the session that the requested website address (URL) is an allowed location, so it forwards the request for the URL. In step 208, the requested URL returns the requested results (pizza places in San Francisco) to the mobile phone with application proxy 120, which in turn returns the results to the disconnected piconet device 200.

The invention can be billed by a wireless operator using their existing billing infrastructure (such as BREW or QPass) for wireless applications.

Other services available on the mobile phone may be utilized, e.g., GPS, file storage, access to media files, etc.

The invention can be used with any non-connected device, such as a handheld game or PC. The invention also has particular applicability to both wireless operators and navigation device manufacturers. Vehicle manufacturers can use the invention to provide low-cost connected services to vehicles both with and without navigation devices. Portable navigation device (PND) manufacturers can use the invention to provide low-cost connected services to PND devices. Ultra-mobile PC manufacturers can use the invention to provide connectivity without the cost of an embedded communications module (ECM), for instance, ultra-mobile PCs, PND and in-car navigation providers using mobile applications as a communication mechanism.

The types of services provided to the disconnected device may be expanded. For instance, the mobile phone with application proxy may integrate with other aspects of the phone or piconet disconnected device, including SMS, microphone, GPS, gyroscope, etc.

While the invention has been described with reference to the exemplary embodiments thereof, those skilled in the art will be able to make various modifications to the described embodiments of the invention without departing from the true spirit and scope of the invention.

What is claimed is:

1. A method of provisioning a wireless phone from a network server to autonomously reject a given URL requested by a piconet device wirelessly connected to said wireless phone, comprising:
   providing a compiled black list of universal resource locator (URL) addresses, via a network server, to an intermediate wireless phone providing pass-on service from a piconet device to URL addresses, said compiled black list relating to at least one URL that is blocked in response to a URL request by said piconet device connected to said intermediate wireless phone; and
   autonomously rejecting, by said intermediate wireless phone, said URL request by said piconet device to a given URL in said compiled black list;
   wherein said piconet device is disconnected from said intermediate wireless phone based on said black list provided to said intermediate wireless phone.

2. The method of provisioning a wireless phone from a network server to autonomously reject a given URL requested by a piconet device wirelessly connected to said wireless phone according to claim 1, wherein:
   said piconet device is a portable navigation device.

3. The method of provisioning a wireless phone from a network server to autonomously reject a given URL requested by a piconet device wirelessly connected to said wireless phone according to claim 1, wherein:
   said piconet device is a music player.

4. The method of provisioning a wireless phone from a network server to autonomously reject a given URL requested by a piconet device wirelessly connected to said wireless phone according to claim 1, wherein:
   said piconet device is telematics hardware.

5. The method of provisioning a wireless phone from a network server to autonomously reject a given URL requested by a piconet device wirelessly connected to said wireless phone according to claim 1, wherein:
   said piconet device is an ultra mobile personal computer.

6. The method of provisioning a wireless phone from a network server to autonomously reject a given URL requested by a piconet device wirelessly connected to said wireless phone according to claim 1, wherein:
   said piconet device is a handheld computer game.

7. A method of provisioning a wireless phone from a network server to autonomously permit a given URL requested by a piconet device wirelessly connected to said wireless phone, comprising:
   providing a compiled white list of universal resource locator (URL) addresses, via a network server, to an intermediate wireless phone providing pass-on service from a piconet device to URL addresses, said compiled white list relating to at least one URL that is permitted in response to a URL request by said piconet device connected to said intermediate wireless phone; and
   autonomously permitting, by said intermediate wireless phone, said URL request by said piconet device to a given URL in said compiled white list;
   whereby said piconet device is permitted connection to said URL via said intermediate wireless phone based on said compiled white list provided to said intermediate wireless phone.

8. The method of provisioning a wireless phone from a network server to autonomously reject a given URL requested by a piconet device wirelessly connected to said wireless phone according to claim 7, wherein:
   said piconet device is a portable navigation device.

9. The method of provisioning a wireless phone from a network server to autonomously reject a given URL requested by a piconet device wirelessly connected to said wireless phone according to claim 7, wherein:
   said piconet device is a music player.

10. The method of provisioning a wireless phone from a network server to autonomously reject a given URL requested by a piconet device wirelessly connected to said wireless phone according to claim 7, wherein:
    said piconet device is telematics hardware.

11. The method of provisioning a wireless phone from a network server to autonomously reject a given URL requested by a piconet device wirelessly connected to said wireless phone according to claim 7, wherein:
    said piconet device is an ultra mobile personal computer.

12. The method of provisioning a wireless phone from a network server to autonomously reject a given URL requested by a piconet device wirelessly connected to said wireless phone according to claim 7, wherein:
    said piconet device is a handheld computer game.

13. A method of provisioning a wireless phone from a network server to autonomously redirect a given URL requested by a piconet device wirelessly connected to said wireless phone, comprising:

providing a compiled redirect list of universal resource locator (URL) addresses, via a network server, to an intermediate wireless phone providing pass-on service from a piconet device to URL addresses, said compiled redirect list relating to at least one URL that is redirected in response to a URL request by said piconet device connected to said intermediate wireless phone; and autonomously replacing, by said intermediate wireless phone, said URL request by said piconet device to a replacement URL from said compiled redirect list based on a match to said requested URL;

wherein said piconet device is enabled communication with said replacement URL via said intermediate wireless phone based on said compiled redirect list provided to said intermediate wireless phone.

14. The method of provisioning a wireless phone from a network server to autonomously redirect a given URL requested by a piconet device wirelessly connected to said wireless phone according to claim 13, wherein:

said replacement URL is assigned by a service provider as an alternative to said requested URL.

\* \* \* \* \*